Patented Apr. 14, 1953

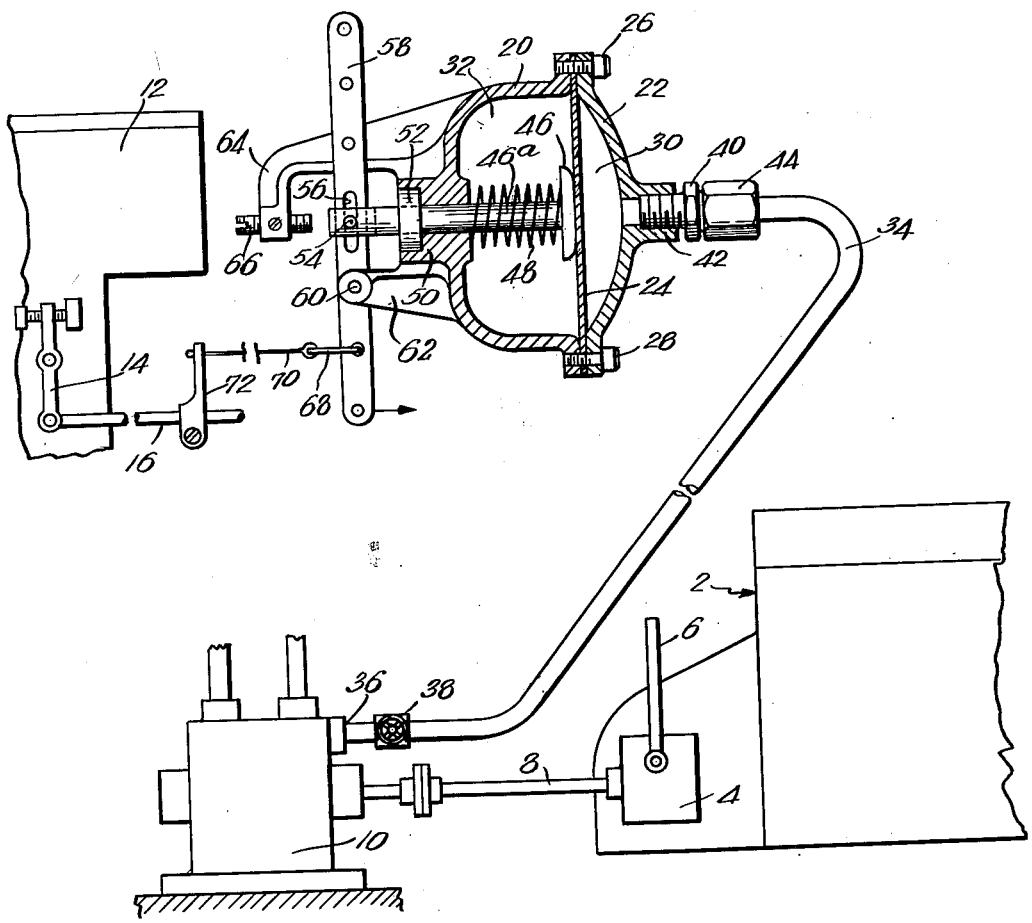

2,634,681

UNITED STATES PATENT OFFICE 2,634,681

PRESSURE RESPONSIVE THROTTLE CONTROL FOR FLUID PUMPING SYSTEMS

William G. Rowell, Wollaston, Mass.

Application May 2, 1952, Serial No. 285,814

3 Claims. (Cl. 103—16)

This invention relates to a throttle control apparatus, and more particularly to an automatic throttle control for use with fuel oil tank trucks of the type which employ a power take-off mechanism driven from the internal combustion engine and operating to pump oil through a delivery hose.

A very considerable amount of difficulty has been encountered in regulating the throttle of such trucks during the time that the operator is away from the truck and actual pumping operation is taking place. A hand throttle positioned at a desirable setting is affected by vibration of the truck motor and cannot be held at the desired setting unless mechanically secured in place, and this is not practical for a number of reasons. If a correct setting is not maintained, of course, the pumping speed may drop and it is then unsatisfactory from an efficiency standpoint. On the other hand, if the throttle is operated at greater speeds, excessive wear takes place in the pumping mechanism and other parts of the tank truck elements.

The present invention deals with the problem indicated and aims to devise an improved throttle control apparatus which can be attached to any delivery truck mechanism to satisfactorily regulate and maintain the throttle at a correct setting for securing maximum pumping efficiency. It is also an object of the invention to provide a device that will automatically be placed in operation as soon as the power take-off mechanism on the truck is engaged with the motor. Still another object of the invention is to provide in a structure of the class indicated safety features which will ensure that the pump speed never exceeds the pumping manufacturer's recommended speed rating and yet at all times an adequate motor speed will be in effect to most efficiently utilize the pumping equipment. Still another object is to provide a control mechanism that is simple in construction and practical in operation; which can be very readily installed; and which is completely reliable and safe in operation.

These and other objects and novel features will be more fully understood and appreciated from the following description of a preferred embodiment of the invention selected for purposes of illustration, in which the single figure shown in the drawing is a diagrammatic view illustrating the control apparatus of the invention, combined with conventional delivery truck parts, and particularly showing a pressure sensitive element of the invention in cross-section.

In the structure shown, parts of a conventional tank truck for delivering fuel oil have been diagrammatically indicated in the drawing, including a truck engine 2 fragmentarily shown at the right-hand side of the drawing, a power take-off mechanism 4 which is engaged with the transmission of the engine 2 in the conventional manner by operating the power take-off lever 6. When the power take-off mechanism is operated by the truck engine transmission a pump drive shaft 8 is rotated to actuate a fluid pump 10 of the usual positive displacement type.

These pumps operate at relatively low speeds of from 350 to 400 R. P. M. It is particularly pointed out that each pump has a maximum efficiency when operated at its rated R. P. M. If such a pump is operated below this maximum efficiency speed, its output in gallons is appreciably reduced. On the other hand, if the pump is operated above its rated R. P. M., excessive wear in the pump can take place and also wear can occur in the power take-off mechanism and other parts of the apparatus. There is also a very unnecessary and expensive fuel and oil consumption when the engine is driving the pump at excessive speeds.

It will be apparent that conventional operation of the pump and power take-off mechanism is entirely dependent upon the speed of the motor 2 which is controlled by the usual carburetor 12 through a carburetor throttle valve 14. This carburetor arrangement commonly includes an accelerator rod 16 which extends rearwardly from the carburetor to a point where it is under the control of a foot pedal in the cab of the truck.

In accordance with the present invention I provide a novel automatic throttle control apparatus which is connected at a point between the pump 10 and the carburetor throttle rod 16 in the manner diagrammatically suggested in the drawing. My improved apparatus includes a pressure sensitive member which operates in response to pressure changes developed in the course of starting and operating the pump 10 after the power take-off 4 has been engaged in the manner described.

The pressure sensitive member generally includes a casing formed of two sections 20 and 22, as indicated. A diaphragm 24 is supported between the two casing sections and flanged portions of the casing sections, together with the diaphragm, are solidly locked against one another by fastening means, such as bolts 26 and 28. It will be observed that there is thus provided a fluid pressure chamber 30 at one side of the diaphragm 24 and an expansion chamber 32 located at the other side of the diaphragm 24.

To conduct fluid into the fluid pressure chamber 30 I provide a conduit member 34 which is connected to the pump, for example, at some convenient point thereon, such as the point of entry 36 of the test plug commonly provided in pumps of the displacement type described. Included in the conduit 34 is a shut-off valve 38 which may be employed conveniently to discontinue operation of the invention at any time that this may be desired and thus return the pumping and throttle control operation to a conventional basis. At its other end the conduit 34 may be formed with a fitting 40 adapted to be threaded into a tapped neck 42 in the casing section 22 and a locking nut 44 solidly holds these members in locked relationship.

Arranged in contact with an adjacent side of the diaphragm 24 is a reciprocating element 46 including a flat plunger head and supporting stem 46a, as shown. A coiled spring 48 normally seeks to maintain the plunger head against the diaphragm with a predetermined pressure.

The casing section 20 is formed with a bearing section 50 through which the stem 46a is slidably received, and an oil seal ring 52 is located around the shaft in a seat formed in the bearing 50 in the manner shown so that a fluid-tight packing is always maintained at the point at which the stem 46a projects from the casing section.

At its extreme outer end the stem 46a carries a pin 54 which is slidably received in a slot 56 formed in an actuating arm 58. The latter member is pivotally secured at 60 on a bracket portion 62 integral with the casing section 20. Also formed integrally with the casing section 20 is a second bracket portion 64 which is of a somewhat U-shaped form and which terminates in a hooked end extending forwardly and downwardly in spaced relation to the end of the plunger stem 46a. Through the hooked end of this bracket section 64 is threaded an adjustable stop element 66 which can be threaded in and out to limit the path through which the plunger and its stem may travel in response to movement of the diaphragm 24.

At the lower end of the actuator arm 58 is a clip member 68 to which is attached a flexible cable member 70. This latter member extends forwardly and is attached to an accelerator rod clamp element 72 which is adjustably secured to the accelerator rod 16, as shown.

The installation and adjustment of the device is very easily carried out and does not require skilled services. All that is necessary is to remove the pressure test plug from the pump 10; install a conventional shut-off valve; and then connect the conduit member 34 at the point indicated. The pressure sensitive member may be mounted on one of the various engine bolts in a suitable location near the foot accelerator throttle valve rod. The actuator arm forming a part of the pressure sensitive member is then connected by the flexible cable 70 to the accelerator valve rod in such a way as to cause the rod to open the throttle when pressure exists in the pressure sensitive member, due to the pump being in operation.

The adjustment of the device consists solely in setting the adjustment screw 66 in the correct position to adjust the apparatus. The pump is first placed in operation, and the adjusting screw then moved until the desired pump speed is attained. The adjusting screw is thereafter locked in position. The hand throttle may be entirely disconnected, if desired, as the pump will automatically attain the proper speed whenever it is pumping fluid.

The operation of the device is as follows: When the tank truck arrives at a delivery point, the driver engages the power take-off lever which, in turn, causes the pump to be connected to the engine. This starts the pump rotating and in so doing the pump builds up a pressure which is transmitted through the conduit 34 to the diaphragm 24. The plunger linkage causes the accelerator throttle control rod to move a predetermined amount in a direction to open the carburetor throttle, thus fixing the engine speed. This condition continues during the period while the operation is delivering oil. As soon as the operation has been completed the operator disconnects the power take-off, stopping the pump. As no further pressure exists in the pump, the accelerator throttle rod is returned by the spring 48 to the normal idling position of the engine. When the foot-operated accelerator throttle rod 16 is operated in normal driving condition, with the pump disengaged, the direction of operation of the rod is such as to override the pressure sensitive linkage.

It will thus be seen that I have provided a novel and efficient device for regulating and maintaining the throttle in a correct position relative to pump operation. A very important factor in the apparatus described is the safety feature which is present. Inasmuch as the fuel is a highly inflammable material, provision must be made for preventing a fire hazard from developing. This has been thoroughly taken care of by the manner in which the device is constructed. Thus, if the diaphragm 24 were to fail or become broken, fuel oil pumped through the line 34 is retained in the expansion chamber 32 and cannot leak by the plunger stem 46a because of the oil seal ring 52. The valve 38 also affords a reliable and convenient means of discontinuing flow of oil to the pressure sensitive member whenever this is desired.

There is also realized another objective less apparent at first glance but, from a practical operating standpoint, of considerable importance. This is the provision of automatic means for reducing the speed of the pump when oil is evacuated from the pump, particularly as occurs when the tank or compartment is emptied. It will readily be appreciated that with the pump engaged during a pumping operation, a substantial load is placed on the engine, and a particular speed is selected, depending upon the setting of the throttle. However, under these circumstances, as soon as the tank runs dry, as sometimes happens, this load is removed from the engine and ordinarily such a change may cause the engine to increase its speed. Such an increase may be highly injurious to the pump as it is not designed to run at a fast speed when dry. It is pointed out that oil passing through the pump supplies internal lubrication and cooling, and any failure of these functions produces excessive heating and wear of the pump. Since applicant's apparatus is entirely dependent upon pressure change, as has been described in detail above, there must occur an automatic reduction in the speed of the engine to a normal idling speed whenever the pump is emptied of fluid.

While I have shown a preferred embodiment of the invention, it should be understood that changes and modifications may be resorted to in keeping with the spirit of the invention as defined by the appended claims.

Having thus described my invention, what I desire to claim as new is:

1. In combination with a tank truck vehicle, an internal combustion engine for propelling said vehicle, a fluid pump arranged to be selectively engaged with said engine for pumping fluids, a foot accelerator throttle rod for controlling the speed of said engine, a pressure actuated mechanism operatively connected in one direction to said accelerator throttle rod, said pressure actuated mechanism having an adjustable stop to limit movement of said throttle rod a predetermined amount, a conduit connecting said pressure actuating mechanism to said fluid pump to cause said pressure actuated mechanism to move said throttle rod a predetermined amount when pressure exists in said fluid pump.

2. In combination with a tank truck vehicle, an internal combustion engine for propelling said vehicle, a fluid pump arranged to be selectively engaged with said engine, a foot operated accelerator throttle control rod arranged to control speed of said engine, a pressure responsive mechanism having a housing, a pressure chamber within said housing, a diaphragm within said housing responsive to pressure within said pressure chamber, a second chamber within said housing separated by said diaphragm from the said pressure chamber, said second chamber being sealed from atmosphere to prevent loss of fluid from housing if said diaphragm is ruptured, a piston in said second chamber spring urged against said diaphragm, a stem of said piston extending outwardly through sealing means in said second chamber, a lever responsively connected to said piston stem and pivotally supported by a member attached to said housing, an adjustable stop screw attached to said member to limit movement of said piston in response to pressure, a mechanical linkage operatively connecting said accelerator throttle control rod to said lever in one direction, a conduit connecting said fluid pump to said pressure chamber to transmit pressure from said pump when in operation to cause said pressure responsive mechanism to advance said throttle control rod a predetermined amount.

3. A device as described in claim 2, in which the pressure responsive mechanism is supported by a bracket adapted to be secured to the engine, the fluid pump means being of the positive displacement type, the engagement mechanism of the pump being of the power take-off type attached to the transmission housing of the engine and arranged so that a driving gear of said power take-off may be selectively engaged with a driving gear of said transmission to cause rotation of said pump when so engaged and the engine is in operation.

WILLIAM G. ROWELL.

References Cited in the file of this patent

UNITED STATES PATENTS

| Number | Name | Date |
|---|---|---|
| 429,570 | Johnson | June 3, 1890 |
| 774,266 | McMullen | Nov. 8, 1904 |
| 1,523,774 | Hoffman | Jan. 20, 1925 |
| 1,692,267 | Holdsworth | Nov. 20, 1928 |
| 1,834,601 | Clapp | Dec. 1, 1931 |